US007503482B2

(12) United States Patent
Wilen

(10) Patent No.: US 7,503,482 B2
(45) Date of Patent: Mar. 17, 2009

(54) SLIDE OUT CARD CONFIGURATION

(75) Inventor: Richard Wilen, Deerfield Beach, FL (US)

(73) Assignee: Wilen Press, LC, Deerfield Beach, FL (US)

(*) Notice: Subject to any disclaimer, the term of this patent is extended or adjusted under 35 U.S.C. 154(b) by 141 days.

(21) Appl. No.: 10/875,369

(22) Filed: Jun. 23, 2004

(65) Prior Publication Data

US 2005/0284927 A1 Dec. 29, 2005

(51) Int. Cl.
*G06K 5/00* (2006.01)

(52) U.S. Cl. .................................... 235/380; 235/381

(58) Field of Classification Search ................ 235/380, 235/381, 383; 40/124.06, 124.19, 124.08, 40/19

See application file for complete search history.

(56) References Cited

U.S. PATENT DOCUMENTS 2,417,982 A * 3/1947 Histed ....................... 229/92.8
3,191,328 A * 6/1965 Lohnes .................... 40/124.08
5,004,271 A * 4/1991 Piatt ............................ 283/65
5,141,252 A * 8/1992 Michlin ..................... 281/15.1
5,513,117 A * 4/1996 Small ......................... 700/233
5,629,977 A * 5/1997 Fonseca ................ 379/114.18
5,640,447 A * 6/1997 Fonseca ................ 379/114.18
5,803,889 A 9/1998 Littman
5,884,770 A * 3/1999 Galm ......................... 206/575
5,933,989 A * 8/1999 Volkert et al. ............ 40/124.08
6,505,737 B1 * 1/2003 Sherman .................. 206/308.1
6,732,459 B1 * 5/2004 Clark ...................... 40/124.06
6,877,263 B2 * 4/2005 Clark ...................... 40/124.06

* cited by examiner

*Primary Examiner*—Daniel st.Cyr
(74) *Attorney, Agent, or Firm*—Ruden McClosky

(57) ABSTRACT

A slide-out card configuration is provided. A presentation section slides outwardly and laterally along the back cover of the card as it is opened. The card may be provided in a packaged form for use as a mailer to deliver advertising to specific recipients by mail. Alternatively, in card form, the present invention provides an integrated gift and greeting card.

27 Claims, 6 Drawing Sheets

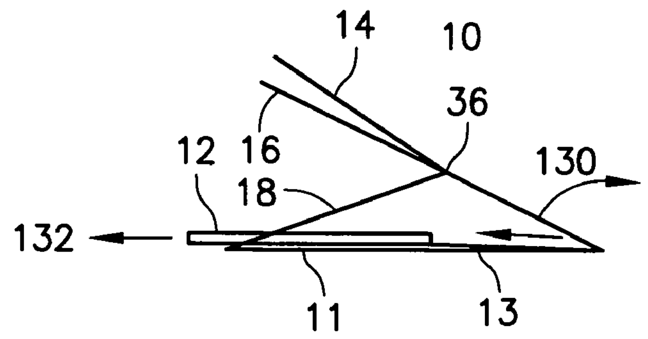
Fig. 1c
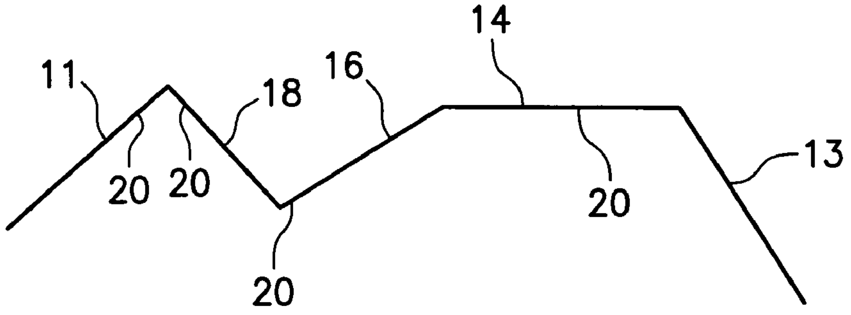
Fig. 2a
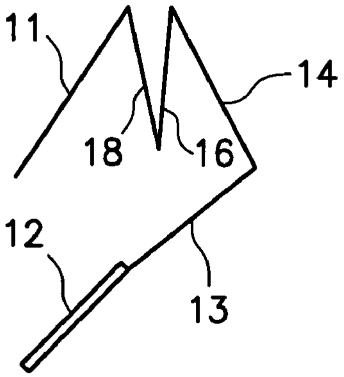
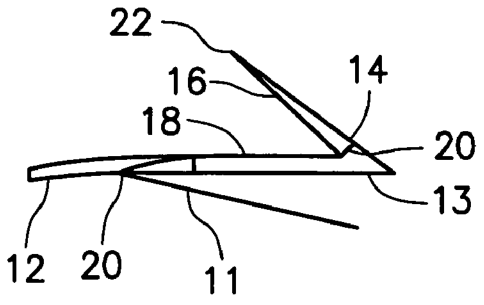
Fig. 2b
Fig. 2c

SLIDE OUT CARD CONFIGURATION

FIELD OF THE INVENTION

The present invention deals with a slide-out card and more specifically, a card that presents specific material when opened by laterally extending the material slidably passed the outer edge of the card.

BACKGROUND OF THE INVENTION

This invention relates generally to mechanical card configurations where the card contains a mechanism that causes a piece or portion of the card to be presented to a user upon opening. The card consists of printed matter in a variety of forms including a package that is mailable to prospective customers. More specifically, the invention relates to the packaging of such material in forms permitting their manufacture by automated methods and techniques.

A popular direct-mail marketing and fund solicitation technique is to combine in one unified package printed matter soliciting contributions or offering merchandise for sale. The manufacture of such "mailers" can be a complicated process, involving the printing of a number of separate and distinct items and the assembly of these items into a common mailable enclosure. The process is particularly burdensome when the targeted audience is large, requiring mass production of mailers in a relatively short period of time.

To date, these advertising mailers typically include a number of pages in a booklet form, with each page having an advertisement printed thereon. U.S. Pat. No. 5,803,889 to Littman purports to disclose a method for making a packet mailer that includes the steps of applying wet glue patterns to a sheet, then folding the sheet and perforating the sheet to form a packet mailer that resembles a booklet.

The present invention relates generally to a method of making a slide-out action product from a single, continuous web of material. For many years various advertising and promotional novelties incorporating sliding and slide-out members have been manufactured by various methods. To the best of the applicant's knowledge, however, none of these methods have produced a slide-out action product of the type described, fabricated from an initial single web of material. Such a method of fabricating slide-out action products is preferable in that the employment of a single roll of paper stock affords the convenient feeding of paper in one-pass through the printing and in-line finishing machinery at a high rate of speed. This allows for the production of thousands of pieces per hour, while minimizing both the time and the cost of production.

SUMMARY OF THE INVENTION

A slide-out card configuration is provided. A presentation section slides outwardly and laterally along the back cover of the card as it is opened. The card may be provided in a packaged form for use as a mailer to deliver advertising to specific recipients by mail. Alternatively, in card form, the present invention provides an integrated gift and greeting card.

Generally speaking, a slide-out card configuration made from a single piece of material comprising a first section, a second section, and a third section made from a different material than the first and second sections is provided. The first, second and third sections are constructed and arranged to cause the third section to laterally slide out passed the first section when the card is opened by moving the second section.

In more detail, a slide-out card made from a single piece of material comprises a left section having a left-section front and back, a left-middle section having a left-middle front and back, a right-middle section having a right-middle front and back, a right section having a right-section front and back, and a slide-out section having a slide-out section front and back. The left section is adjacent to the left-middle section, the left-middle is adjacent to the right-middle, the right-middle is adjacent to the right section, the right section is adjacent to the slid-out section, the left-middle section front folds onto the right-middle section back, the right section back folds onto the right-middle section back, the slide-out section back folds onto the left-middle section back, and the left section back folds onto the slide-out section front.

In accordance with an alternative embodiment, a slide-out mailer, made from a single piece of material comprises a first page having a first page front and back, a second page having a second page front and back, a third page having a third page front and back, a back panel having a back panel front and back, and a presentation section having a presentation section front and back. The back panel is adjacent to the first advertising page, the first advertising page is adjacent to the second advertising page, the second advertising page is adjacent to the third advertising page, the third advertising page is adjacent to the presentation section, the first page front folds onto the second page front, the third page back folds onto the second page back, the presentation section back folds onto the first page back, and the presentation section front folds onto the back panel back.

In accordance with further aspects of an embodiment of the present invention, a method for making a pop-out card configuration is provided comprising the steps of providing a single sheet of material, folding the sheet at a predetermined distance from a left edge to provide a left section, the fold creating a left section folded edge, the left section having a left section front and back, folding the sheet at a predetermined distance from the left section folded edge to provide a left-middle section, the fold creating a left-middle section folded edge, the left-middle section having a left-middle front and back, folding the sheet at a predetermined distance from the left-middle section folded edge to provide a right-middle section, the fold creating a right-middle section folded edge, the right-middle section having a right-middle front and back, folding the sheet at a predetermined distance from the right-middle section folded edge to provide a right section, the fold creating a right section folded edge, the right section having a right section front and back, folding the sheet at a predetermined distance from the right section folded edge to provide a slide-out section, the slide-out section having a slide-out front and back, folding the left-middle section front onto the right-middle section back, folding the right section back onto the right-middle section back, folding the slide-out section back onto the left-middle section back, and folding the left section back onto the slide-out section front.

BRIEF DESCRIPTION OF THE DRAWINGS

FIG. 1*c* is a bottom view of the mailer of FIG. 1*a* and FIG. 1*b* between a fully open and a fully closed configuration.

FIG. 2*a* shows a bottom view of a single continuous piece of material folded in accordance with an embodiment of the present invention to form the mailer of FIG. 1*a*.

FIG. 2*b* shows the piece of material of FIG. 2*a* being further folded in accordance with an embodiment of the present invention.

FIG. 2*c* shows the piece of material of FIG. 2*b* being fully folded to form a mailer in accordance with an embodiment of the present invention.

DETAILED DESCRIPTION

To bring special attention to a specific piece of material, a slide-out card is provided that, when opened, presents the specific material to a user in such a way that focuses a user's attention on the material. The card may also include a number of pages for additional advertising when used as a mailer.

Figure 1A:
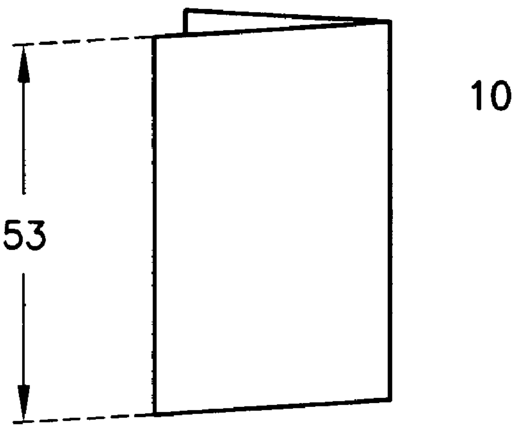
FIG. 1*a* shows a slide-out mailer in accordance with an embodiment of the present invention.
Figure 1B:
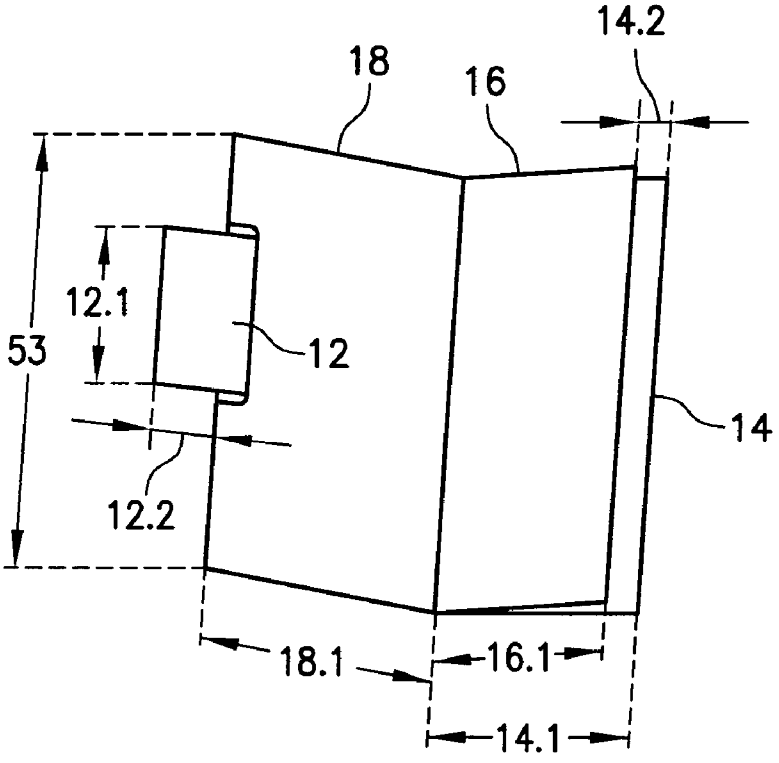
FIG. 1*b* shows the mailer of FIG. 1*a* in an open configuration with an extended piece of material presented to a user.

FIG. 1*a* shows a mailer in accordance with an embodiment of the present invention generally indicated by reference numeral 10 in a closed configuration. FIG. 1*b* shows the mailer 10 in an open configuration. On one side, the right side in this particular example, is a second 16 and third advertising page 14. On the other side, the left in this example, is a first advertising page 18 and a slide-out extension 12 which may include an additional piece of advertising. In this way, special attention is brought to the matter printed on the extension 12. Alternatively, a financial transactions card, such as a telephone card, gift card, credit card, or debit card, among others may be substituted.

Special offers and advertising tied to the matter printed on the extension is included in the remainder of the mailer, in addition to separate advertisements and offers. For example, the extension can hold a discount card for a retail store and the other advertising pages have advertisements for products carried by that store printed thereon. A pre-paid credit card may be presented on the extension 12 as well, with the advertising pages 14, 16 and 18 containing further information about the card, such as instructions for use, locations where the card is accepted, advantages of using the card, and so on.

In the open configuration shown in FIG. 1*b*, the user's attention is focused on the slide-out extension 12. In this way, an advertiser can direct attention to the material he or she prefers, whether it is a special offer, some specific information or a particular transactional card.

In accordance with a preferred embodiment of the present invention, the length 53 of the mailer is uniform for each section. The length 12.1 of the extension can be anywhere from about 25-75% of the mailer length 53. Preferably, the extension length 12.1 is 25-50% of the mailer length 53 and most preferably 25-35% of the mailer length 53. The extension distance 12.2 that the extension piece actually extends from the mailer 10 may be anywhere from 30-100% of the first page width 18.1. Preferably, the extension distance 12.2 is 40-80% and most preferably 50-70% of the first page width 18.1.

The width of each section does not have to be uniform and in a preferred embodiment, the inner pages are narrower than the outer pages so that the outer side edge of a back page is visible even when a page in front is laid over it. For example, referring to the exemplary embodiment in FIG. 1*b*, the width 18.1 of the first page 18 is equal to the width 14.1 of the third page 14. The width 16.1 of the second page 16 is less than the width 14.1 of the third page 14 so that when the mailer 10 is open, the outer edge of the third page 14 is visible, providing a vertical strip 14.2 upon which advertising material, preferably indicating the contents of the third page 14, may be printed.

FIG. 1*c* shows the mailer of FIGS. 1*a* and 1*b* from the bottom. The back of the third page 14 provides a cover for the mailer 10. The third page 14 is pulled in the direction of arrow 130. As the page 14 is pulled in that direction 30, it pivots around a fulcrum 36 and a presentation section 13 slides along the plane of the back panel 11 in the direction of arrow 34. The slide-out extension 12, which is connected to the end of the presentation section 13, is pushed through an opening between the back panel 11 and the first advertising page 18 in the direction and along the plane of arrow 132. The point where the first 18 and second 16 advertising page meet is glued to the inside of the third advertising page 14 at the fulcrum 36. Preferably, the slide-out extension is a different material than the rest of the card.

Generally speaking, the first page 18 provides a first section, and the third page 14 provides a second wherein movement of the second section causes a third section, namely, the presentation section 13 to slide out.

In accordance with an embodiment of the present invention, the slide-out mailer is formed from a single sheet of paper. FIG. 2*a* shows a side view of a single sheet of paper folded at the end of each section. Glue 20 is applied at specific points, where indicated, on the sheet and folded as shown in FIG. 2*a*. The first page section 18 is folded onto the second page section 16. The third page section 14 is folded onto the second page section. A slit is made at the crease where the back panel section 11 and the first page section 18 meet. The extension piece 12 is attached to the presentation section 13 and the extension piece inserted through the slit bringing the presentation section between the back panel section 11 and the first page section 18. FIG. 2*c* shows the sheet after these folds are made. Glue 20 holds the mailer at the specific spots and the crease 22 where the second 16 and third 14 page meet is cut.

In accordance with an alternative embodiment of the present invention, an integrated gift and greeting card is provided where the extended material is a financial transaction card, e.g., gift card, phone card. With the advent of electronics, gift cards are becoming more and more popular as an alternative to money. They are considered a more personal gift because it requires more thought than merely writing a check or stuffing cash in an envelope, but still allows flexibility in gift-giving.

Figure 3A:
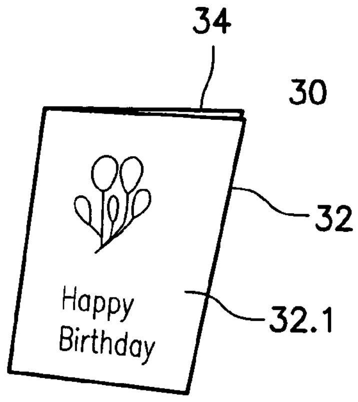
FIG. 3*a* shows an integrated gift and greeting card according to an embodiment of the present invention.

FIG. 3*a* shows an integrated gift and greeting card generally indicated by reference numeral 30 with a front cover 32 and a back cover 34 in closed form. The front cover has an exterior face 32.1 which adorns a greeting with best wishes for a certain occasion, a birthday in this example.

Figure 3B:
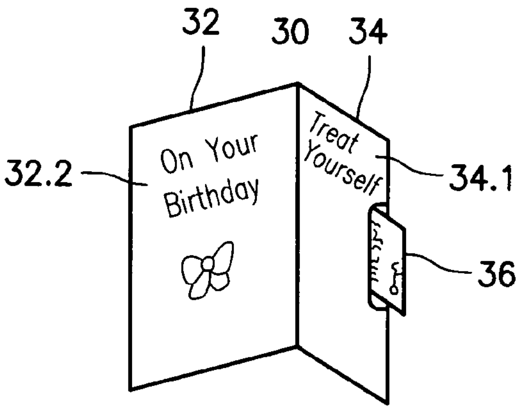
FIG. 3*b* shows the card of FIG. 3*a* in a partially opened configuration.

FIG. 3*b* shows the card of FIG. 3*a* in a partially opened form. The front cover has an interior face 32.2 with a further greeting and message for the certain occasion. The back cover 34 has an interior face 34.1 as well, with a further message related to the one on the front interior face 32.2 and front exterior face 32.1.

A gift card 36 is presented through an opening in the back cover 34 as the card 30 is opened. The further the card is opened, the further the gift card 36 is presented until the card is fully opened as shown in FIG. 3*c*.

Figure 3C:
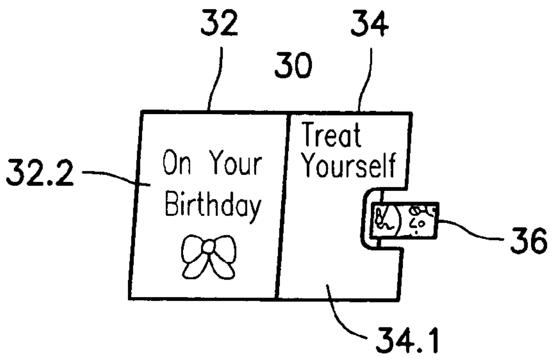
FIG. 3*c* shows the card of FIG. 3*b* in a fully opened configuration.
Figure 4:
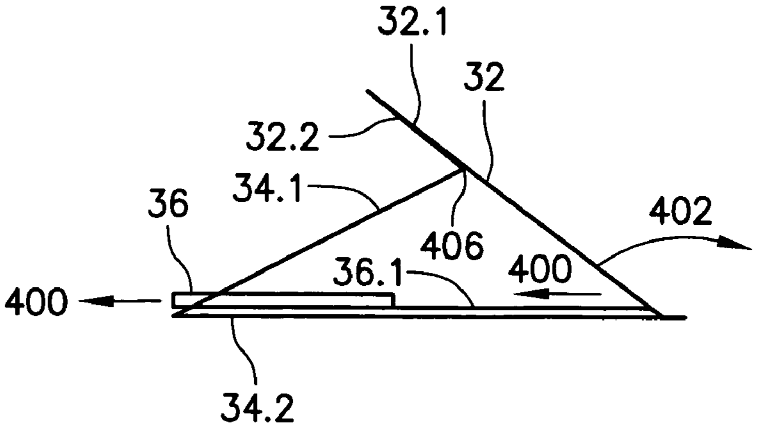
FIG. 4 is a bottom view of the card in FIG. 3*a*.

FIG. 4 shows a bottom view of the integrated gift and greeting card from FIGS. 3*a*, 3*b* and 3*c*. To open the card, the front cover 32 is pulled out and over in an arc following the direction of arrow 402. As the cover 32 moves, it pivots around a fulcrum 406, pushing the gift card 36 via a gift card presentation section 36.1 laterally along the plane of the back cover 34 exterior face 34.2, sliding the card 36 out passed the edge of the card.

Generally speaking, the interior face 34.1 is a first section, the front cover 32 is a second section, and the presentation section 36.1 is a third section. Movement of the second section causes the third section to slide out.

Figure 5A:
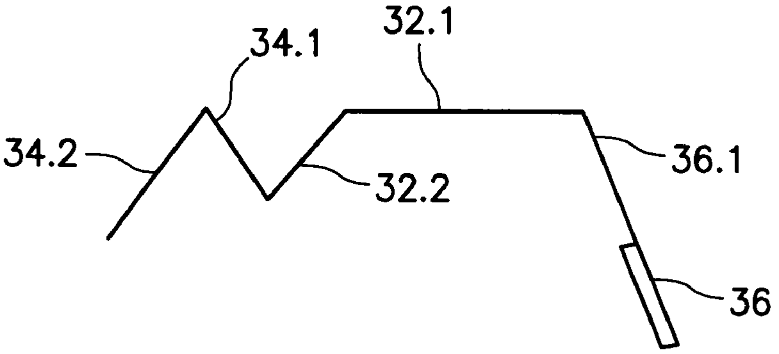
FIG. 5*a* shows a bottom view of a continuous sheet of material used to make the card of FIGS. 3*a*-3*c*.
Figure 5B:
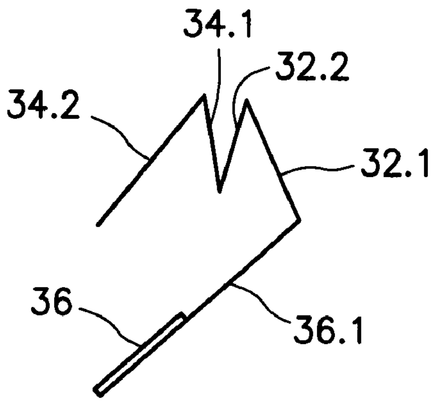
FIG. 5*b* shows the sheet of FIG. 5*a* folded in accordance with an embodiment of the present invention in the method of making the card of FIGS. 3*a*-3*c*.
Figure 5C:
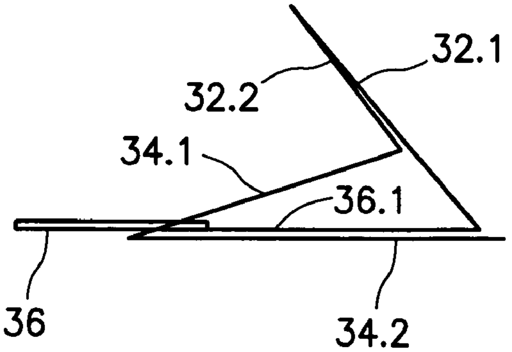
FIG. 5*c* shows the sheet of FIGS. 5*a* and 5*b* in a fully folded configuration to make the card of FIGS. 3*a* to 3*c*.

FIGS. 5*a* to 5*c* show the steps in the method of making the card of FIG. 4 from one continuous piece of material 50. Folds are made at predetermined lines along the length of the material 50, as depicted in FIG. 5*a*. The folds are made perpendicular to the material's length to provide the back cover exterior face 34.2, the back cover interior face 34.1, the front cover interior face 32.2, front cover exterior face 32.1 and the gift card presentation section 36.1. The gift card 36 is attached to the gift card presentation section 36.1 at its free end.

The material 50 is further folded, as shown in FIG. 5*b*, bringing the exterior face 34.2 and the interior face 34.1 of the back cover adjacent to one another, as well as bringing the interior face 32.2 and exterior face 32.1 of the front cover together. Referring to FIG. 5*c*, a slit 52 is cut into the interior face of the back cover by the folded line between the exterior face 34.2 and the interior face 34.1 of the back cover. The gift card 36 is slid into the slit and glue 54 is applied between the interior face 32.2 and the exterior face 32.1 of the front cover.

Figure 6A:
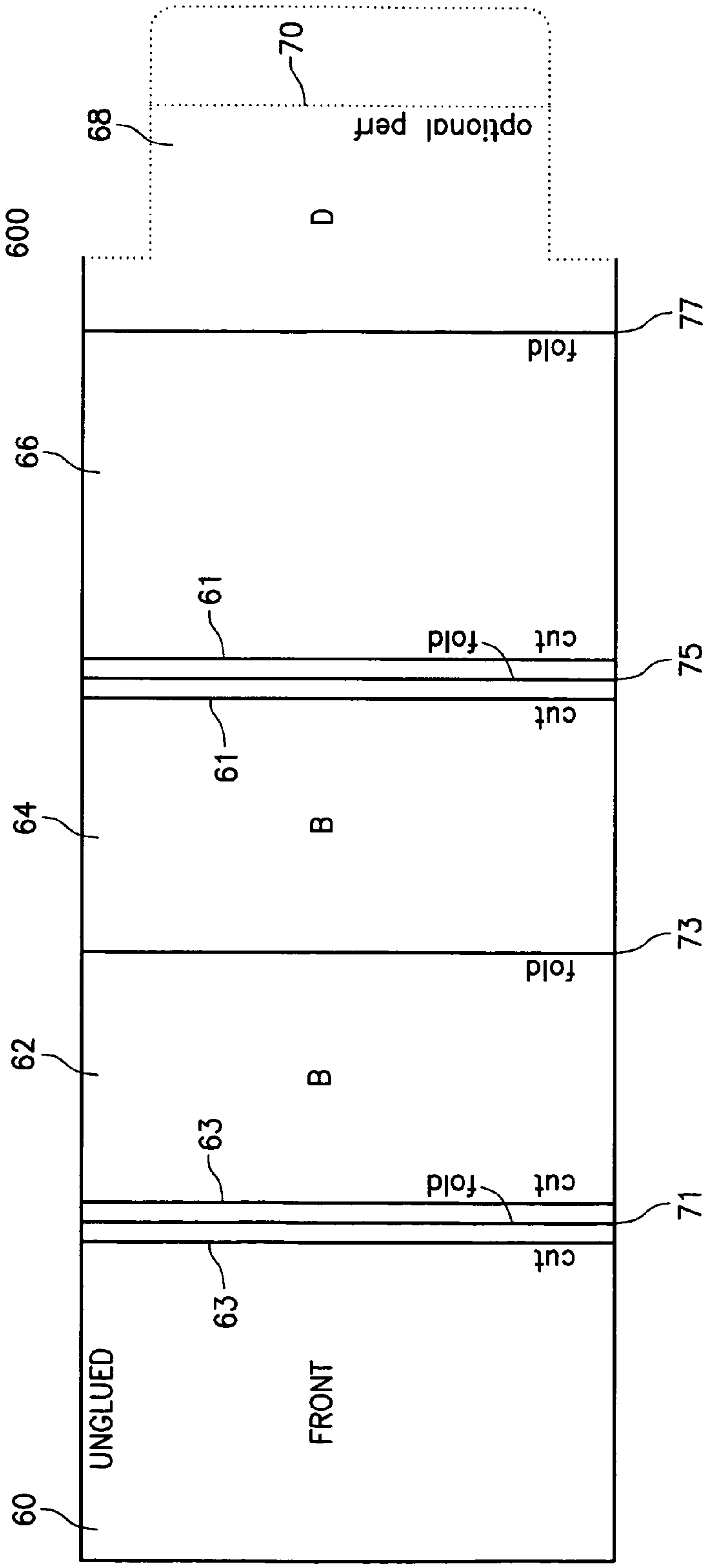
FIG. 6*a* is a front side view of a continuous sheet of material used to make a slide-out card configuration according to an embodiment of the present invention.
Figure 6B:
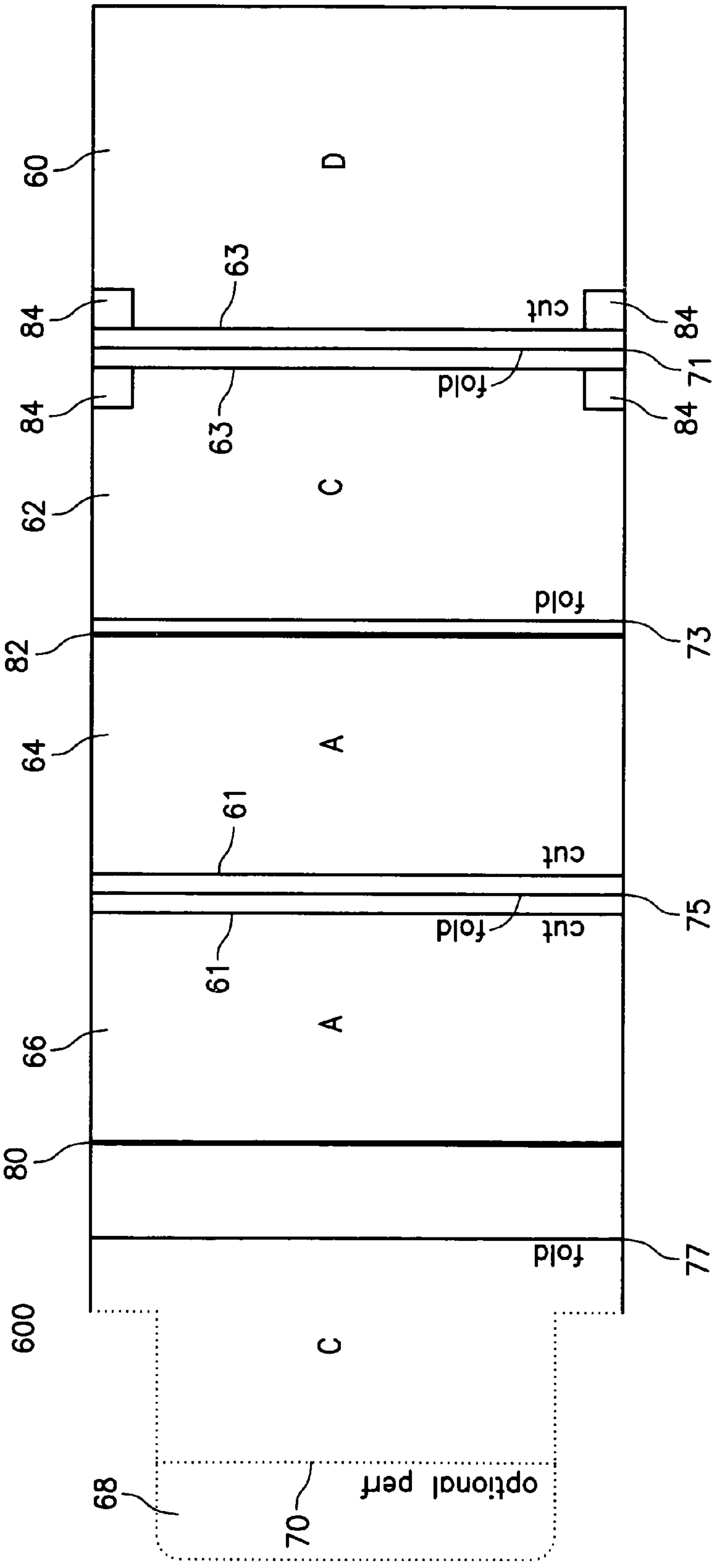
FIG. 6*b* is a back side view of the sheet in FIG. 6*a*.

FIG. 6*a* shows the front of a single sheet of material 600, preferably some sort of paper, used to form a slide-out card configuration according to an embodiment of the present invention. The capital letters, such as "B", show the sections of the sheet 600 that fold onto each other. A left section 60 is adjacent to a left middle section 62, which is adjacent to a right middle section 64, which is adjacent to a right section 66, which is adjacent to a slide-out section 68. There is a left fold line 71, a middle fold line 73, a right fold line 75 and a presentation fold line 77. A perforation line 70 is optional and when included, provides a means to detach an attached transaction card. Alternatively, in place of the perforation, easily removable glue may be used.

FIG. 6*a* shows the back side of the sheet 600. Again, the capital letters on the sheet indicate which sections fold onto each other and on which side. First, glue is applied to the back side of the sheet along left glue line 80, right glue line 82, and glue sections 84. The back side of the right middle section 64 is folded onto the back side of the right section 66 (A to A) along fold line 75, held together by glue lines 80 and 82. The front side of the left middle section 62 is then folded onto the front side of the right middle section 64 (B to B) along fold line 73. The front of the presentation section 68 is then folded onto the front side of the left middle section 62 (C to C) along line 77. The back side of the left section 60 is then folded onto the front side of the presentation section 68 (D to D) along line 71 and held together by glue sections 84.

In this folded and glued configuration, cuts are made along cut lines 61 and 63 to make the slide out mailer configuration. To make the integrated gift and greeting card, only cut line 63 would be cut.

In the preceding specification, the invention has been described with reference to specific exemplary embodiments thereof. It will however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. A slide-out card configuration made from a single piece of material comprising:

a first section;

a second section;

a third section;

a slide out extension made from a different material than the first, second and third sections to focus a user's attention on the slide out extension separate from the first section, the second section and the third section, the first section being foldably attached to the second section, the second section being foldably attached to the third section, and the slide out extension being removably attached to the third section;

wherein the first, second and third sections are constructed and arranged to cause the slide out extension to laterally slide out passed the first section when the card is opened by moving the second section.

2. The card configuration of claim 1 wherein the slide out extension is a transaction card.

3. The card configuration of claim 2 wherein the transaction card is a pre-paid calling card.

4. The card configuration of claim 2 wherein the transaction card is a gift card.

5. The card configuration of claim 2 wherein the transaction card is a pre-paid debit card.

6. A slide-out card made from a single piece of material, the single piece of material comprising:

a left section having a left-section front and back;

a left-middle section having a left-middle front and back;

a right-middle section having a right-middle front and back;

a right section having a right-section front and back;

a presentation section having a presentation section front and back;

a slide-out section having a slide-out section front and back, said slide out section being made from different material than the left section, the left-middle section, the right-middle section, the right section and the presentation section to focus a user's attention on the slide-out section; wherein;

the left section is adjacent to the left-middle section;

the left-middle is adjacent to the right-middle;

the right-middle is adjacent to the right section;

the right section is adjacent to the presentation section;

the presentation section is adjacent to the slide-out section;

the left-middle section front folds onto-the right-middle section back;

the right section back folds onto the right-middle section back;

the presentation section folds onto the left-middle section;

the left section back folds onto the presentation section front;

the slide-out section back is capable of being fed through a slot located on a fold between the left section and the left middle section.

7. The card of claim 6 further whereby the slide-out section is a transaction card.

8. The card of claim 7 wherein the transaction card is a pre-paid calling card.

9. The card of claim 7 wherein the transaction card is a gift card.

10. The card of claim 7 wherein the transaction card is a pre-paid debit card.

11. A slide-out mailer, made from a single piece of material, the single piece comprising:

a first page having a first page front and back;

a second page having a second page front and back;

a third page having a third page front and back;

a back panel having a back panel front and back;

a presentation section having a presentation section front and back;

a slide-out section having a slide-out section front and back section, wherein:

said slide out section being made of different material from the other sections to focus a user's attention on the slide out wherein:

the back panel is adjacent to the first advertising page;

the first advertising page is adjacent to the second advertising page;

the second advertising page is adjacent to the third advertising page;

the third advertising page is adjacent to the presentation section;

the presentation panel is adjacent to the slide-out section;

the first page front folds onto the second page front;

the third page back folds onto the second page back;

the presentation section back folds onto the first page back;

the presentation section front folds onto the back panel back;

the slide-out section is capable of being fed through an opening located on a fold between the first panel and the back panel.

12. The card of claim 11 whereby the slide-out section is a transaction card.

13. The card of claim 12 wherein the transaction card is a pre-paid calling card.

14. The card of claim 12 wherein the transaction card is a gift card.

15. The card of claim 12 wherein the transaction card is a pre-paid debit card.

16. A method for making a slide-out card configuration comprising the steps of:

providing a single sheet of material;

folding the sheet at a predetermined distance from a left edge to provide a left section, the fold creating a left section folded edge, the left section having a left section front and back;

folding the sheet at a predetermined distance from the left section folded edge to provide a left middle section, the fold creating a left-middle section folded edge, the left-middle section having a left-middle front and back;

folding the sheet at a predetermined distance from the left-middle section folded edge to provide a right-middle section, the fold creating a right-middle section folded edge, the right-middle section having a right-middle front and back;

folding the sheet at a predetermined distance from the right-middle section folded edge to provide a right section, the fold creating a right section folded edge, the right section having a right section front and back;

folding the sheet at a predetermined distance from the right section folded edge to provide a presentation section, the presentation section having a presentation front and back;

folding the left-middle section front onto the right-middle section back;

folding the right section back onto the right-middle section back;

folding the presentation section back onto the left-middle section back;

folding the left section back onto the presentation section front;

placing a slide-out section adjacent to a fold line between the left section and left middle section whereby the slide out section slides out of the opening when the card is opened, the slide-out section having a slide-out front and back section and being made of different material than other sections of said sheet to focus a user's attention on the slide out section.

17. The method of claim 16 wherein the slide-out section is a transaction card.

18. The method of claim 17 wherein the transaction card is a pre-paid calling card.

19. The method of claim 17 wherein the transaction card is a gift card.

20. The method of claim 17 wherein the transactional card is a pre-paid debit card.

21. The method of claim 17 wherein the transaction card is a coupon.

22. The method of claim 16 further comprising the step of applying glue on a portion of the right section back.

23. The method of claim 16 further comprising the step of applying glue on a portion of the right-middle section back.

24. The method of claim 16 further comprising the step of applying glue on a portion of the left-middle section back.

25. The method of claim 16 further comprising the step of applying glue on a portion of the left section back.

26. The method of claim 16 further comprising the step of cutting the left section folded edge.

27. The method of claim 16 further comprising the step of cutting the left section folded edge.

* * * * *